United States Patent [19]

Neitzel et al.

[11] Patent Number: 4,918,308

[45] Date of Patent: Apr. 17, 1990

[54] INTEGRATED DETECTOR DEWAR CRYOENGINE

[75] Inventors: Fred J. Neitzel, Santa Barbara; Leonard E. Peck, Jr., Goleta; Richard M. Rall, Palos Verdes, all of Calif.

[73] Assignee: Santa Barbara Research Center, Goleta, Calif.

[21] Appl. No.: 327,374

[22] Filed: Mar. 20, 1989

Related U.S. Application Data

[63] Continuation of Ser. No. 933,507, Nov. 21, 1986, abandoned.

[51] Int. Cl.⁴ .............................................. G01J 5/06
[52] U.S. Cl. ...................................... 250/352; 62/51.1
[58] Field of Search ................. 250/352; 62/51.1, 51.2

[56] References Cited

U.S. PATENT DOCUMENTS

| | | | |
|---|---|---|---|
| 3,055,191 | 9/1962 | Dennis | 250/352 |
| 3,851,173 | 11/1974 | Taylor et al. | 250/352 |
| 4,262,200 | 4/1981 | Guy | 250/352 |
| 4,451,735 | 5/1984 | Diedrich et al. | 250/352 |
| 4,761,556 | 8/1988 | Simpson et al. | 250/352 |

FOREIGN PATENT DOCUMENTS

| | | |
|---|---|---|
| 0115698 | 8/1984 | European Pat. Off. |
| 57-27075 | 2/1982 | Japan . |
| 57-31181 | 2/1982 | Japan . |
| 86/00889 | 3/1987 | PCT Int'l Appl. . |
| 2027181 | 2/1980 | United Kingdom . |

Primary Examiner—Carolyn E. Fields
Attorney, Agent, or Firm—W. C. Schubert; W. K. Denson-Low

[57] ABSTRACT

The present invention is directed to an integrated detector dewar cryoengine (10). The integrated detector dewar cryoengine (10) includes a detector (12) for detecting received electromagnetic radiation. The integrated detector dewar cryoengine (10) further comprises expander end cap (18) for removing thermal energy from said detector (12) which is in mechanical communication with said detector (12).

7 Claims, 2 Drawing Sheets

INTEGRATED DETECTOR DEWAR CRYOENGINE

This application is a continuation of application Ser. No. 933,507, filed Nov. 21, 1986, now abandoned.

BACKGROUND OF THE INVENTION

1. Field of the Invention

This invention relates to the field of infrared sensing, and more particularly to an integrated detector dewar cryoengine.

2. Description of Related Art

Infrared detectors are often used in conjunction with missiles and night vision systems to sense the presence of electromagnetic radiation having a wavelength of 1–15 μm. Because they are often most sensitive when operating at approximately 77° K., infrared detectors such as those fabricated from mercury-cadmium-telluride often require a cryoengine assembly to produce and maintain the required operating temperature. Such cryoengine assemblies are typically used in conjunction with an evacuated dewar in which the infrared detector is placed. The dewar is evacuated to remove thermally conductive gases which would otherwise occupy the region surrounding the detector. The dewar is cooled by placing an indented region ("coldwell") of the dewar in contact with an expansion chamber ("expander") of the cryoengine assembly which is supplied with a cooling fluid such as helium. The coldwell and the expander are separated by a gap to allow for variation in the dimensional characteristics of the dewar and expander, as well as to accommodate for differences in their thermal expansion characteristics.

To supply the expander with the cooling fluid, the cryoengine assembly often includes a compressor which delivers the fluid to the expander through a transfer line. As the fluid expands in the expander, it absorbs thermal energy from both the expander and the dewar causing the detector to cool. Because the temperature of the expander is related to the amount of fluid delivered by the compressor, the temperature of the detector may be controlled by varying the compressor speed.

While the infrared detector assemblies described above were able to produce and maintain the temperature levels required for sensitive operation of the mercury-cadmium-telluride detectors, they often had several disadvantages in terms of thermal conduction between the expander and the environment. Because the dewar and expander are structurally independent, the gap between the expander and the dewar acted as an insulator to prevent optimal conduction between the expander and the detector. In addition, the cross-sectional area through which cold loss occurred not only included the cross-sectional area of expander, but also included the walls of the dewar which were adjacent to the expander. These two features necessarily meant that the capacity of the cryoengine had to be somewhat larger than would otherwise be required.

SUMMARY OF THE INVENTION

An apparatus for detecting electromagnetic radiation is disclosed. The apparatus comprises a detector for detecting electromagnetic radiation. The apparatus also comprises an expander end cap for removing thermal energy from said detector. The device for removing thermal energy from said detector mechanically communicates with the detector.

BRIEF DESCRIPTION OF THE DRAWINGS

Various advantages of the present invention will become apparent to one skilled in the art upon reading the following specification and by reference to the drawings in which.

DETAILED DESCRIPTION OF THE PREFERRED EMBODIMENT

With reference to the drawings, an integrated detector dewar cryoengine 10 according to the present invention is shown. The integrated detector dewar cryoengine 10 includes an infrared detector 12 for receiving infrared radiation and generating responsive electrical signals. While the detector 12 may be made from a layer of mercury-cadmium-telluride on a sapphire substrate material, other suitable materials such as CdTe and CdSe may also be used. The detector 12 is secured on a detector platform 14 by a thermally conductive adhesive, which permits thermal energy to flow from the detector 12. While the detector platform 14 may be fabricated from beryllium, other suitable materials may be used.

Figure 2:
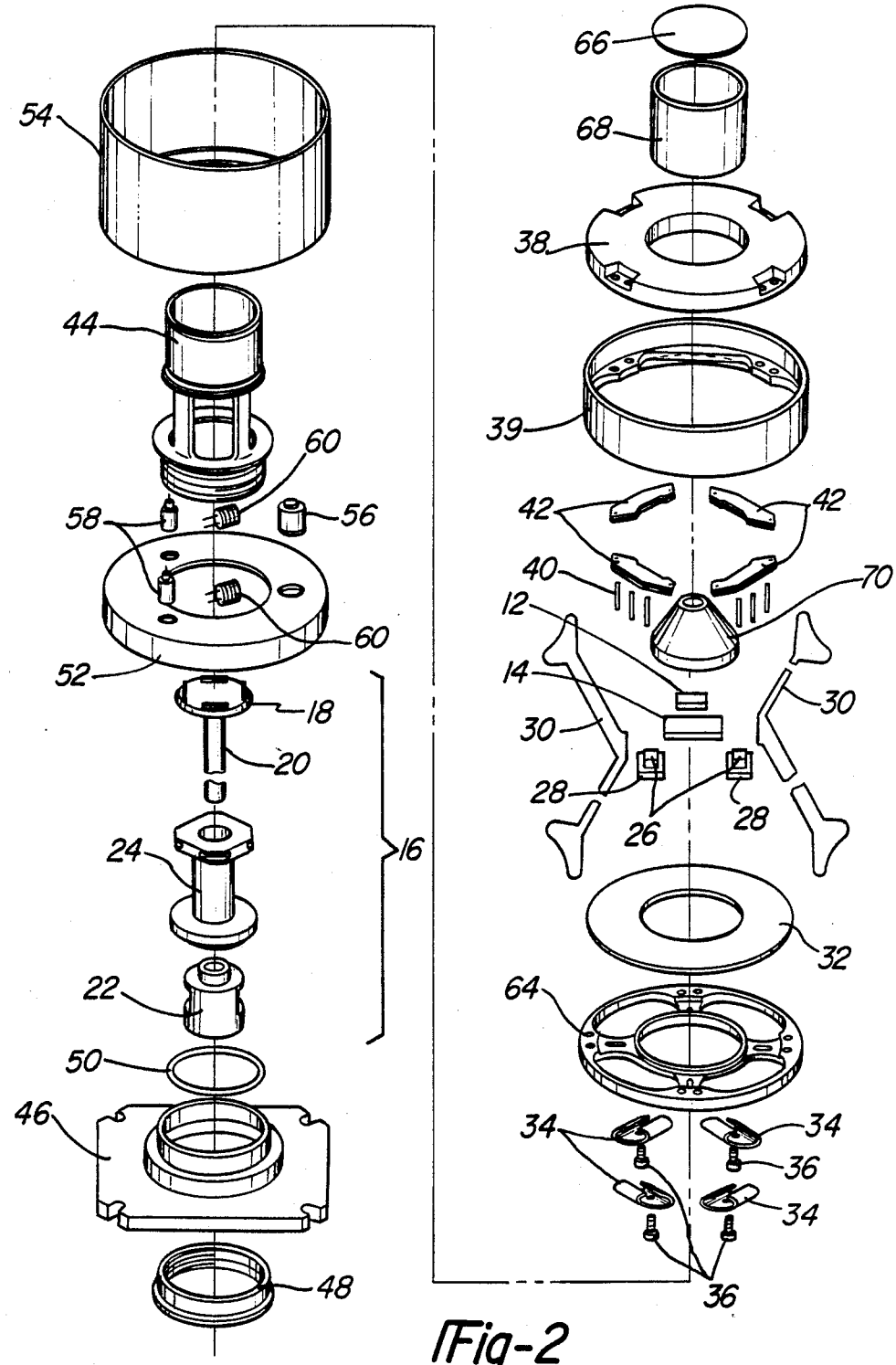
FIG. 2 is an exploded perspective view of the integrated detector cryoengine shown in FIG. 1.

To remove thermal energy from the detector 12 so as to permit optimum detector performance, the integrated detector dewar cryoengine 10 further comprises an expander assembly 16 (see FIG. 2). The expander assembly 16 includes an expander end cap 18 which mechanically communicates with the detector platform 14 so that thermal energy can flow from the detector platform 14 to the expander end cap 18. The detector platform 14 is disposed between two of four castellations located on the expander end cap 18 and is secured to the expander end cap 18 by means of a thermally conductive adhesive. The expander end cap 18 is disc shaped so as to have a low thermal mass and a high thermal conductivity. The expander end cap 18 is preferably fabricated from beryllium so as to provide a relatively high degree of thermal conductivity, though it is to be understood that other suitable materials may be used.

The expander assembly 16 also includes an expander tube 20 which is brazed to the expander end cap 18. The expander tube 20 houses the refrigeration mechanism for cooling the detector 12 and receives cooling fluid such as helium from a compressor (not shown). By expansion of the fluid inside the expander tube 20, thermal energy is drawn from the expander end cap 18 thereby cooling the detector 12. The expander tube 20 is preferably fabricated from Inconel so as to have low thermal conductivity while being sufficiently rigid to minimize detector movement during operation. To support the expander tube 20, an expander housing 22 is provided. The expander housing 22 is brazed to the expander tube 20 and is connected to the cryoengine compressor (not shown). The expander assembly 16 also includes a cable support 24 which is used to support the flex cables described below.

To monitor the temperature of the infrared detector array, two thermal sensors 26 are located adjacent to the detector 12 on the flex cables described below. The outputs from the thermal sensors 26 are used to control the compressor speed which in turn controls the temperature of the expander assembly 16. Each of the thermal sensors 26 may be a 2N2222 switching diode, though it is to be understood that other suitable temperature sensors which are sensitive to temperature variation in the requisite ranges may be used. To mount the thermal sensors 26 on the expander end cap 18, a thermal sensor mount 28 is provided. The thermal sensors 26 are secured to the thermal sensor mount 28 by means of a thermally conductive adhesive. The thermal sensor mount 28 may be fabricated from a ceramic, though other suitable materials may be used.

Figure 1:
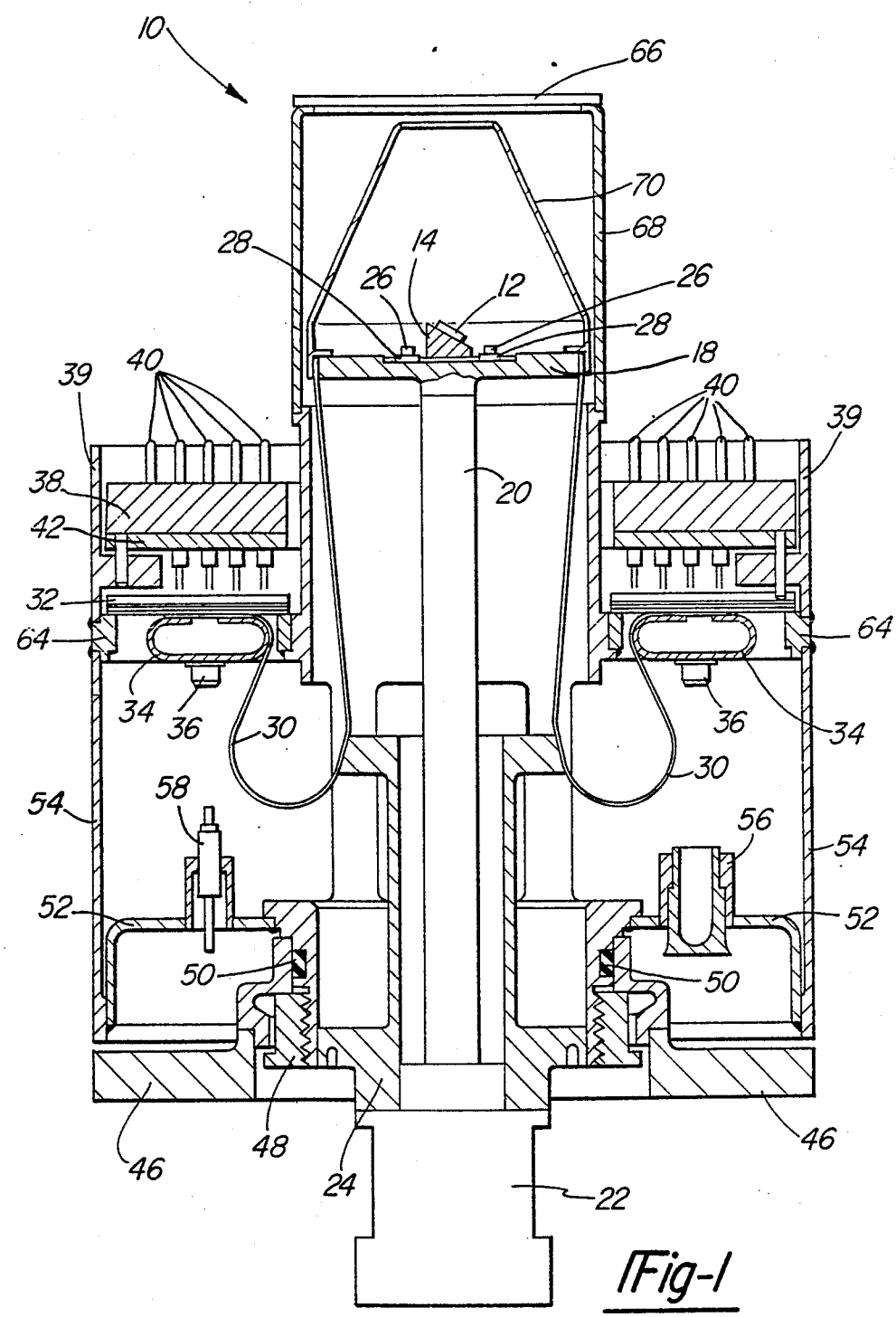
FIG. 1 is a cross-sectional view of the integrated detector dewar cryoengine by the present invention.

To permit electrical communicatiion between the detector 12 and external electronics, two flex cables 30 are provided. The flex cables 30 permit signals generated by the detector 12 to be delivered to a distribution board 32. The flex cables 30 are attached at one end to the conductive pads of the detector 12 through gold lead wires. The other end of the flex cables 30 connect to a distribution board 32. For purposes of clarity, the flex cables shown in FIG. 1 have been rotated by 45°. The flex cables 30 comprise a flexible etched circuit having metallic conductors disposed between layers of polymide base dielectric material attached by means of an acrylic adhesive. The distribution board 32 includes a plurality of internal conductors oriented to permit access to the electrical signals delivered to one side of the distribution board by the flex cables 30 to the opposing side of the distribution board 32. A plurality of load springs 34 and screws 36 are provided to clamp the flex cables 30 to the distribution board 32.

To permit access to the electrical signals delivered to the distribution board 32 by the flex cables 30, a connector 38 is provided. The connector 38 receives the electrical signals from the distribution board 32 through a plurality of conductive pins 40. The conductive pins 40 extend from the distribution board 32 through the connector 38 to a position above the connector 38 where they can be accessed. A shroud 39 is provided to protect the distribution board 32 from the environment. To appropriately bias to the detectors 12, the bias resistor board 42 is provided with electrically communicates with the connector 38. The bias resistor board 42 functions as a voltage divider so that the appropriate voltages are delivered to the detector 12 to ensure proper operation.

To provide structural integrity to the integrated detector dewar cryoengine 10, the integrated detector dewar cryoengine 10 further comprises an assembly housing 44 and a mount plate 46. The assembly housing 44 is used to provide structural support to the components of the integrated detector dewar cryoengine 10, and may be fabricated from a low expansion alloy. It is to be understood, however, that other suitable materials may be used. The mount plate 46 is used to secure the integrated detector dewar cryoengine 10 in its appropriate position. The mount plate 46 mechanically communicates with a base adjustment nut 48, which permits rotation of the mount plate 46 independent of the expander housing 22. An O-ring 50 is disposed between expander housing 22 and the mount plate 46 to provide friction upon rotation of the mount plate 46.

To environmentally isolate the detector 12 and the expander end cap 18, the integrated detector dewar cryoengine 10 further comprises a bulkhead 52 and a shield 54. The bulkhead 52 is welded to the assembly housing 44 and mechanically communicates with an evacuation tube 56. The evacuation tube 56 is used to withdraw gases from the integrated detector dewar cryoengine 10 to maximize the thermal isolation. The bulkhead 52 also communicates with two getter feedthrus 58 which communicate with two getters 60. The getters 60 are used during the evacuation process to further eliminate gases inside the integrated detector dewar cryoengine 10. The bulkhead 52 mechanically communicates with shield 54 and a frame 64 to form the sides of the vacuum chamber. A window 66 and a window housing 68 are provided to form the top of the vacuum chamber. The window 66 is fabricated from germanium or zinc selenide to produce the desired transmission band, and is used to transmit incoming infrared radiation on the detector 12. The window housing 68 is used to support the window 66 and to permit the integrated detector dewar cryoengine 10 to be evacuated.

To minimize the amount of thermal radiation delivered to the detector 12 from sources other than the scene, a coldshield 70 is provided which is centrally located over the detector 12. The coldshield 70 is connected to two of four castellations on the expander end cap 18 and has an aperture which provides an unobstructed path for infrared radiation from the environment to be received by the detector 12. The coldshield 70 has a thin wall and is fabricated from a high conductivity material so as to have a relatively low thermal mass which reduces cooldown time. While the coldshield may be fabricated from 6061-T6 aluminum, it is to be understood that other suitable materials may be used.

Because the detector 12 is in direct thermal communication with the expander end cap 18, the detector 12 may be cooled more rapidly than would otherwise be possible. In addition, because the dewar and the expander form an integrated unit, the cross-sectional area through which cold loss can occur is reduced. It should therefore be understood that this invention was described in connection with a particular example thereof. Other modificatiions will become apparent to those skilled in the art after a study of the specification, drawings, and following claims.

What is claimed is:

1. An apparatus for detecting electromagnetic radiation comprising:

detector means for detecting electromagnetic radiation;

means for removing thermal energy from said detector means by repeated compression and expansion of a fluid, said means for removing thermal energy comprising an expander operable to receive said fluid and having a cylindrical body with a disc-shaped projection at one end; and means for environmentally isolating said detector means and said means for removing thermal energy from said detector means so as to permit a vacuum to be formed in a region of said apparatus adjacent said detector means and said expander, said means for environmentally isolating further comprising an assembly housing and a bulkhead, said assembly housing mechanically communicating with said bulkhead.

2. The apparatus of claim 1, wherein said means for environmentally isolating said detector means and said means for removing thermal energy from said detector means further comprises a shield mechanically communicating with said bulkhead.

3. The apparatus of claim 2, wherein said means for environmentally isolating said detector means and said means for removing thermal energy from said detector means further comprises a frame mechanically communicating with said shield.

4. The apparatus of claim 3, wherein said means for environmentally isolating said detector means and said means for removing thermal energy from said detector means further comprises a distribution board mechanically communicating with said frame.

5. The apparatus of claim 4, wherein said means for environmentally isolating said detector means and said means for removing thermal energy from said detector means further comprises a window housing mechanically communicating with said assembly housing.

6. The apparatus of claim 5, wherein said means for environmentally isolating said detector means and said means for removing thermal energy from said detector means further comprises a window mechanically communicating with said window housing.

7. The apparatus of claim 1, wherein said means for removing thermal energy from said detector means comprises a detector mount disposed on said disc-shaped projection of said expander, said detector means mechanically communicating with said detector mount.

* * * * *